(12) United States Patent
Deng et al.

(10) Patent No.: US 12,202,352 B2
(45) Date of Patent: Jan. 21, 2025

(54) CRYOSTAT DEVICE FOR SUPERCONDUCTING MAGNETIC LEVITATION TRAIN AND OPERATION METHOD THEREOF

(71) Applicant: SOUTHWEST JIAOTONG UNIVERSITY, Chengdu (CN)

(72) Inventors: Zigang Deng, Chengdu (CN); Chenling Xian, Chengdu (CN); Yongfu Yang, Chengdu (CN); Xueli Li, Chengdu (CN); Jun Zheng, Chengdu (CN)

(73) Assignee: SOUTHWEST JIAOTONG UNIVERSITY, Chengdu (CN)

( * ) Notice: Subject to any disclaimer, the term of this patent is extended or adjusted under 35 U.S.C. 154(b) by 0 days.

(21) Appl. No.: 18/768,309

(22) Filed: Jul. 10, 2024

(65) Prior Publication Data

US 2024/0359714 A1 Oct. 31, 2024

Related U.S. Application Data

(63) Continuation of application No. PCT/CN2024/087277, filed on Apr. 11, 2024.

(30) Foreign Application Priority Data

Oct. 12, 2023 (CN) .......................... 202311319605.2

(51) Int. Cl.
*B61B 13/08* (2006.01)
*B60L 13/04* (2006.01)
*F25D 19/00* (2006.01)

(52) U.S. Cl.
CPC .............. *B60L 13/04* (2013.01); *B61B 13/08* (2013.01); *F25D 19/006* (2013.01); *Y02T 30/00* (2013.01); *Y10S 505/907* (2013.01)

(58) Field of Classification Search
None
See application file for complete search history.

(56) References Cited

U.S. PATENT DOCUMENTS

| 5,317,976 A | * | 6/1994 | Aruga | ..................... B60L 13/10 104/285 |
| 11,552,580 B1 | * | 1/2023 | Zheng | ..................... B60L 13/04 |

(Continued)

FOREIGN PATENT DOCUMENTS

| CN | 1408593 A | * | 4/2003 |
| CN | 101741276 A | | 6/2010 |

(Continued)

OTHER PUBLICATIONS

CN115440461 A English Machine Translation (Year: 2022).*

(Continued)

*Primary Examiner* — Jenna M Maroney (57) ABSTRACT

A cryostat device for a superconducting magnetic levitation train includes a conduction assembly, a support assembly and a refrigeration assembly. The conduction assembly includes a conduction shell, a copper box arranged in the conduction shell, and a thermally-conductive support rod assembly. A top of the thermally-conductive support rod assembly is connected with a bottom of the copper box. A bottom of the thermally-conductive support rod assembly is connected with a bottom wall of the conduction shell. A top of the copper box is provided with a superconducting bulk accommodating cavity. The bottom of the copper box is provided with a cooling energy connecting end. A top of the support assembly is configured to support the conduction assembly. A bottom of the support assembly is connected with a bogie chassis. The refrigeration assembly is provided with a cooling energy input end connected with the cooling energy connecting end.

8 Claims, 9 Drawing Sheets

(56) References Cited

U.S. PATENT DOCUMENTS

| | | | |
|---|---|---|---|
| 2007/0051115 A1 | 3/2007 | Kraus et al. | |
| 2008/0115510 A1* | 5/2008 | Crowley | F25B 9/145 174/15.1 |
| 2008/0278270 A1* | 11/2008 | Hull | F16C 37/005 310/90.5 |
| 2015/0015260 A1* | 1/2015 | Harrison | H01F 6/06 324/318 |
| 2017/0051874 A1 | 2/2017 | Strobel | |
| 2021/0065945 A1* | 3/2021 | Ma | H01F 6/006 |
| 2023/0221103 A1 | 7/2023 | Deng et al. | |

FOREIGN PATENT DOCUMENTS

| | | | | |
|---|---|---|---|---|
| CN | 101923148 A | | 12/2010 | |
| CN | 103225650 A | | 7/2013 | |
| CN | 103366917 A | * | 10/2013 | F25D 19/006 |
| CN | 205428618 U | * | 8/2016 | |
| CN | 107393676 A | | 11/2017 | |
| CN | 206725103 U | * | 12/2017 | |
| CN | 109887701 A | * | 6/2019 | |
| CN | 110440477 A | | 11/2019 | |
| CN | 111435619 A | | 7/2020 | |
| CN | 111540559 A | | 8/2020 | |
| CN | 211346004 U | | 8/2020 | |
| CN | 113815426 A | * | 12/2021 | |
| CN | 114420399 A | * | 4/2022 | |
| CN | 114520087 A | * | 5/2022 | |
| CN | 115440461 A | * | 12/2022 | |
| CN | 115946541 A | | 4/2023 | |
| CN | 116227611 A | | 6/2023 | |
| CN | 117048653 A | | 11/2023 | |
| CN | 117048653 B | * | 12/2023 | |
| GB | 2339011 A | * | 1/2000 | F25B 9/145 |
| JP | 05234749 A | * | 9/1993 | |
| JP | H0623265 U | | 3/1994 | |
| JP | H08162316 A | | 6/1996 | |
| JP | 2001272126 A | * | 10/2001 | F25B 9/145 |
| JP | 2008279917 A | * | 11/2008 | |
| JP | 2008283803 A | | 11/2008 | |
| JP | 2016211803 A | * | 12/2016 | |
| KR | 20160044207 A | * | 4/2016 | |
| KR | 101823379 B1 | * | 1/2018 | |
| KR | 20190142822 A | | 12/2019 | |
| WO | WO-2014112343 A1 | * | 7/2014 | F25B 9/10 |

OTHER PUBLICATIONS

JP 2016211803 A English Machine Translation (Year: 2016).*
CN1408593 A English Machine Translation (Year: 2003).*
CN-106671822-A English Machine Translation and Foreign Document (Year: 2017).*
Zigang Deng et al., "Relationship of the Maximum Levitation Force of Bulk High Temperature Superconductor in Zero-Field-Cooling and Field-Cooling Case", Chinese Journal of Low Temperature Physics, Aug. 15, 2009, vol. 31, No. 3, pp. 230-233.

* cited by examiner

CRYOSTAT DEVICE FOR SUPERCONDUCTING MAGNETIC LEVITATION TRAIN AND OPERATION METHOD THEREOF

CROSS-REFERENCE TO RELATED APPLICATIONS

This application is a continuation of International Patent Application No. PCT/CN2024/087277, filed on Apr. 11, 2024, which claims the benefit of priority from Chinese Patent Application No. 202311319605.2, filed on Oct. 12, 2023. The content of the aforementioned application, including any intervening amendments thereto, is incorporated herein by reference in its entirety.

TECHNICAL FIELD

This application relates to the field of superconducting magnetic levitation, and more particularly to a cryostat device for a superconducting magnetic levitation train and an operation method thereof.

BACKGROUND

In the prior art, an operation mode of the magnetic levitation train commonly includes electromagnetic suspension (EMS), electrodynamic suspension (EDS) and superconducting magnetic levitation (SML). In addition to the zero magnetic resistance, the superconducting magnetic levitation also a flux pinning characteristic, such that it can simultaneously provide a levitation force and a guidance force. In this regard, the superconducting magnetic levitation has received widespread attention. In the existing superconducting magnetic levitation devices, an on-board superconducting bulk is mounted in a cryostat device, and is directly cooled by the liquid nitrogen bath. However, such cooling method requires regular liquid nitrogen replenishment for the cryostat device. The train operation efficiency will be reduced after the long-term and repeated liquid replenishment. Moreover, the levitation performance of the superconducting bulk is limited. Therefore, a cryostat device, which has convenient maintenance to ensure the long-term stable operation of the superconducting magnetic levitation train and can also improve the levitation performance of the superconducting bulk, is urgently needed for the superconducting magnetic levitation train.

SUMMARY

An object of this application is to provide a cryostat device for a superconducting magnetic levitation train and an operation method thereof to improve the above problems in the prior art.

Technical solutions of this application will be described as follows.

In a first aspect, this application provides a cryostat device for a superconducting magnetic levitation train, comprising:
  a conduction assembly;
  a support assembly; and
  a refrigeration assembly;
  wherein the conduction assembly comprises a conduction shell, a copper box, and a thermally-conductive support rod assembly; the copper box is arranged in the conduction shell; a top of the thermally-conductive support rod assembly is fixedly connected with a bottom of the copper box, and a bottom of the thermally-conductive support rod assembly is fixedly connected with a bottom wall of the conduction shell; a top of the copper box is provided with a superconducting bulk accommodating cavity, and the bottom of the copper box is provided with a cooling energy connecting end;
  a top of the support assembly is configured to support the conduction assembly, and a bottom of the support assembly is configured to be connected with a bogie chassis of the superconducting magnetic levitation train; and
  the refrigeration assembly is provided with a cooling energy input end, and the cooling energy input end is connected with the cooling energy connecting end.

In a second aspect, this application provides a method for operating the cryostat device, comprising:
  starting the refrigeration assembly; imputing a preset cooling energy from the cooling energy input end, and conducting the preset cooling energy through the cooling energy connecting end;
  conducting the preset cooling energy into the superconducting bulk accommodating cavity in the copper box to cool a plurality of superconducting bulks in the superconducting bulk accommodating cavity; and
  according to a temperature feedback from a temperature sensor group, adjusting a power of a resistance wire to make the plurality of superconducting bulks reach a preset temperature value.

The present disclosure has the following beneficial effects.

The cryostat device provided herein employs a refrigeration assembly to provide the superconducting bulks with cooling energy. The cooling energy input end is connected with the cooling energy connecting end to maintain a low temperature environment. An indirect conduction heat leakage structure is adopted to reduce the heat leakage of the cryostat device while ensuring the structural strength. In addition, a control temperature of the cryostat device can be lower than a temperature of the liquid nitrogen to improve the levitation performance of the superconducting bulk. In terms of temperature adjustment, the cryostat device has large temperature adjustment range and controllable temperature, which can ensure the long-term stable operation of the superconducting magnetic levitation train. Compared with the existing liquid nitrogen-based conduction cooling structure, the cryostat device of the present disclosure has greatly-reduced maintenance cost.

Other features and advantages of the present disclosure will be described below, and part of them will become obvious in the specification or will be understood through implementation of the technical solutions of the present disclosure. The objects and other advantages of the present disclosure can be realized through the structure particularly indicated in the specification, appended claims and accompanying drawings.

BRIEF DESCRIPTION OF THE DRAWINGS

In order to illustrate the technical solutions of embodiments of this application more clearly, the required accompanying drawings will be briefly introduced below. It should be understood that presented in the accompanying drawings are merely some embodiments of this application, and thus should not be considered as the limitation to the scope of the present disclosure. For those of ordinary skill in the art, other relevant accompanying drawings can also be obtained according to these drawings without making creative effort.

In the figures: 11, conduction shell; 12, copper box; 13, thermally-conductive support rod assembly; 15, thermal bridge; 121, cooling energy connecting end; 122, superconducting bulk accommodating cavity; 2, support assembly; 3, refrigeration assembly; 30, cooling energy input end; 31, cold finger mounting base; 32, adjusting spring; 33, resistance wire; 41, transverse fin; 42, longitudinal fin; 5, superconducting bulk; 50, aviation plug; 51, first vacuum nozzle; 52, second vacuum nozzle; 71, train body; 72, connecting rod; and 8, compression rod.

DETAILED DESCRIPTION OF EMBODIMENTS

In order to illustrate the objects, technical solutions and advantages of embodiments of this application more clearly, the technical solutions of the embodiments of this application will be clearly and fully described below with reference to the accompanying drawings. It is obvious that described herein are only some embodiments of the present disclosure, rather than all embodiments. In general, the components in the embodiments described and shown herein can be arranged and designed in different configurations. Therefore, the detailed description of the embodiments of this application presented with reference to the accompanying drawings is only to illustrate preferred embodiments of this application, rather than limiting the scope of this application. Based on the embodiments of this application, other embodiments obtained by those of ordinary skill in the art without making creative effort shall fall within the scope of this application.

In should be noted that similar labels and letters represent similar items in the accompanying drawings, therefore, once an item has been defined in one of the accompanying drawings, it does not need to be further defined and explained in the subsequent accompanying drawings. As used herein, the terms "first" and "second" are only used for description and distinguishment, rather than indicating or implying the relative importance.

Embodiment 1

In a cryostat device provided herein for a superconducting magnetic levitation train, the levitation and guidance functions of a superconducting bulk are based on the electromagnetic induction law with a magnetic field provided by a Halbach permanent magnet array. Magnetization directions of each permanent magnet of the Halbach permanent magnet array are combined in a specific direction to generate a high magnetic field intensity.

According to a calculation formula for Lorentz force, a levitation force on the superconducting bulk at any position within an external magnetic field is calculated as follows:

$$F_{lev} = \int \left[ J_c \frac{B_x(\delta_0) - B_x(0)}{\delta_0} \right] dv;$$

where $F_{lev}$ represents the levitation force on the superconducting bulk at any position within the external magnetic field; $J_c$ represents a critical current density; $B_x(\delta_0)$ represents a tangential magnetic induction density of the external magnetic field at a penetration depth $\delta_0$ in the superconducting bulk; $B_x(0)$ represents a tangential magnetic induction density of the external magnetic field on a surface of the superconducting bulk; $\delta_0$ represents a value of the penetration depth; and dv represents a velocity of the superconducting bulk in the external magnetic field.

Therefore, main factors affecting the levitation force are the critical current density and a magnetic field intensity. Regarding the critical current density, the critical current density based on an internal temperature of the superconducting bulk is calculated as follows:

$$J_c(T) = J_{c0} \frac{T_c - T}{T_c - T_0};$$

where $J_c(T)$ represents a critical current density at an internal temperature T of the superconducting bulk; $J_{c0}$ represents a critical current density at a preset initial temperature of the superconducting bulk; $T_0$ represents the preset initial temperature of the superconducting bulk; $T_c$ represents a preset critical temperature; and T represents the internal temperature of the superconducting bulk at present.

In an embodiment, by reducing the preset initial temperature of the superconducting bulk, the critical current density is increased, thereby increasing the levitation force of the superconducting bulk.

For calculating a cooling energy of a refrigeration assembly, the present disclosure mainly considers radiation heat leakage and conduction heat leakage, which are calculated by a calculation model for the radiation heat leakage and a calculation model for the conduction heat leakage.

The calculation model for the radiation heat leakage is expressed as follows:

$$Q_{rad} = \frac{\sigma A_1 (T_2^4 - T_1^4) \varepsilon_1 \varepsilon_2}{(N+1) \left[ \varepsilon_2 + \frac{A_1}{A_2}(1 - \varepsilon_2)\varepsilon_1 \right]};$$

where $Q_{rad}$ represents a radiation heat leakage between two objects; N represents a layer number of a multi-layer insulation material; $\sigma$ represents a Stefan-Boltzmann constant; $\varepsilon_1$ represents an emissivity of a radiated object of the two objects, and $\varepsilon_2$ represents an emissivity of a radiating object of the two objects; $A_1$ represents a surface area of the radiated object; $A_2$ represents a surface area of the radiating object; and $T_1$ represents a temperature of the radiated object, and $T_2$ represents a temperature of the radiating object.

The calculation model for the conduction heat leakage is expressed as follows:

$$Q_{cond} = A\frac{\lambda}{\delta}\Delta t;$$

where $Q_{cond}$ represents the conduction heat leakage; A represents a cross sectional area of the multilayer insulation material; λ represents a thermal conductivity of a material of a thermally-conductive support rod assembly; δ represents a length of the thermally-conductive support rod assembly; and Δt represents a temperature difference between a cold wall and a hot wall.

For setting the cooling energy of the refrigeration assembly, a set value of the cooling energy is larger than the radiation heat leakage and the conduction heat leakage generated from the cryostat device.

Referring to FIGS. 1-6, the cryostat device for a superconducting magnetic levitation train includes a conduction assembly. The conduction assembly includes a conduction shell 11, a copper box 12, and the thermally-conductive support rod assembly 13. The copper box 12 is arranged in the conduction shell 11. A top of the thermally-conductive support rod assembly 13 is fixedly connected with a bottom of the copper box 12, and a bottom of the thermally-conductive support rod assembly 13 is fixedly connected with a bottom wall of the conduction shell 11. A top of the copper box 12 is provided with a superconducting bulk accommodating cavity, and the bottom of the copper box 12 is provided with a cooling energy connecting end 121.

An inner wall of the conduction shell 11 is provided with a silver coating, which is prepared by a silver deposition method to reduce the radiation heat leakage and a contact thermal resistance. In an embodiment, the conduction shell 11 is made of a 304 stainless steel material to withstand atmospheric pressure.

A transverse thermally-conductive support rod is provided in the conduction assembly. The transverse thermally-conductive support rod is configured to prevent the copper box 12 from contacting the inner wall of the conduction shell 11 due to a guiding force of the superconducting bulk 5, avoiding the occurrence of a large amount of heat leakage.

The cryostat device further includes a support assembly 2. A top of the support assembly 2 is configured to support the conduction assembly, and a bottom of the support assembly 2 is configured to connect with a bogie chassis 6. In an embodiment, the support assembly 2 includes four alloy rods made of 7 series aluminum alloys to withstand a levitation guiding force transmitted from the cryostat device.

The cryostat device further includes the refrigeration assembly 3. The refrigeration assembly 3 is provided with a cooling energy input end 30, and the cooling energy input end 30 is connected with the cooling energy connecting end 121.

In an embodiment, the refrigeration assembly 3 is a Stirling-type pulse tube refrigerator. Both sides of the Stirling-type pulse tube refrigerator are provided with a fan. A heat dissipation fin is provided on a top of the Stirling-type pulse tube refrigerator. The Stirling-type pulse tube refrigerator is provided with a control panel, and the control panel is configured to control a cooling energy output value and an output power of the Stirling-type pulse tube refrigerator.

In an embodiment, the thermally-conductive support rod assembly 13 is made of a fiber reinforced plastics G-10 material, which is a mixture of glass fiber and epoxy resin.

In an embodiment, the cryostat device further includes a fin assembly to increase a thermal uniformity of the superconducting bulk 5 at a later period and increase a heat conduction efficiency. The fin assembly includes a transverse fin 41 and a plurality of longitudinal fins 42. The transverse fin 41 is arranged along a lengthwise direction of the copper box 12, and the plurality of longitudinal fins 42 are perpendicularly connected to the transverse fin 41 in sequence such that a plurality of superconducting bulk mounting cavities 122 are formed in the superconducting bulk accommodating cavity. Each of the plurality of superconducting bulk mounting cavities 122 has a preset volume.

In an embodiment, the cryostat device further includes a plurality of superconducting bulks 5 to determine a mounting structure of each of the plurality of superconducting bulk mounting cavities 122. The plurality of superconducting bulks 5 are connected with the plurality of superconducting bulk mounting cavities 122 in one-to-one correspondence, and a mounting height of each of the plurality of superconducting bulks 5 is flush with the top of the copper box 12.

In the cryostat device, the transverse fin 41 and the plurality of longitudinal fins 42 are provided, and a periphery of each of the plurality of superconducting bulks 5 is configured to be in directly contact with the transverse fin 41 and the plurality of longitudinal fins 42, improving the heat conduction efficiency. In an embodiment, all faces of each of the plurality of superconducting bulks 5 are provided with a silver coating which are prepared by the silver deposition method to reduce the radiation heat leakage and the contact thermal resistance. In addition, the plurality of superconducting bulks 5 are adhesively connected with the plurality of superconducting bulk mounting cavities 122 through a low temperature adhesive. In an embodiment, each of the plurality of superconducting bulks 5 has a size of 64×32×13 mm.

In an embodiment, the cryostat device further includes a thermal bridge 15. The thermal bridge 15 is provided between the copper box 12 and the bottom wall of the conduction shell 11. The thermally-conductive support rod assembly 13 includes a first support rod group and a second support rod group. A top of the first support rod group is fixedly connected with the bottom of the copper box 12, and a bottom of the first support rod group is fixedly connected with a top of the thermal bridge 15. A top of the second support rod group is fixedly connected with a bottom of the thermal bridge 15, and a bottom of the second support rod group is fixedly connected with the bottom wall of the conduction shell 11. In an embodiment, the thermal bridge 15 is made of the fiber reinforced plastics G-10 material.

Figure 1:
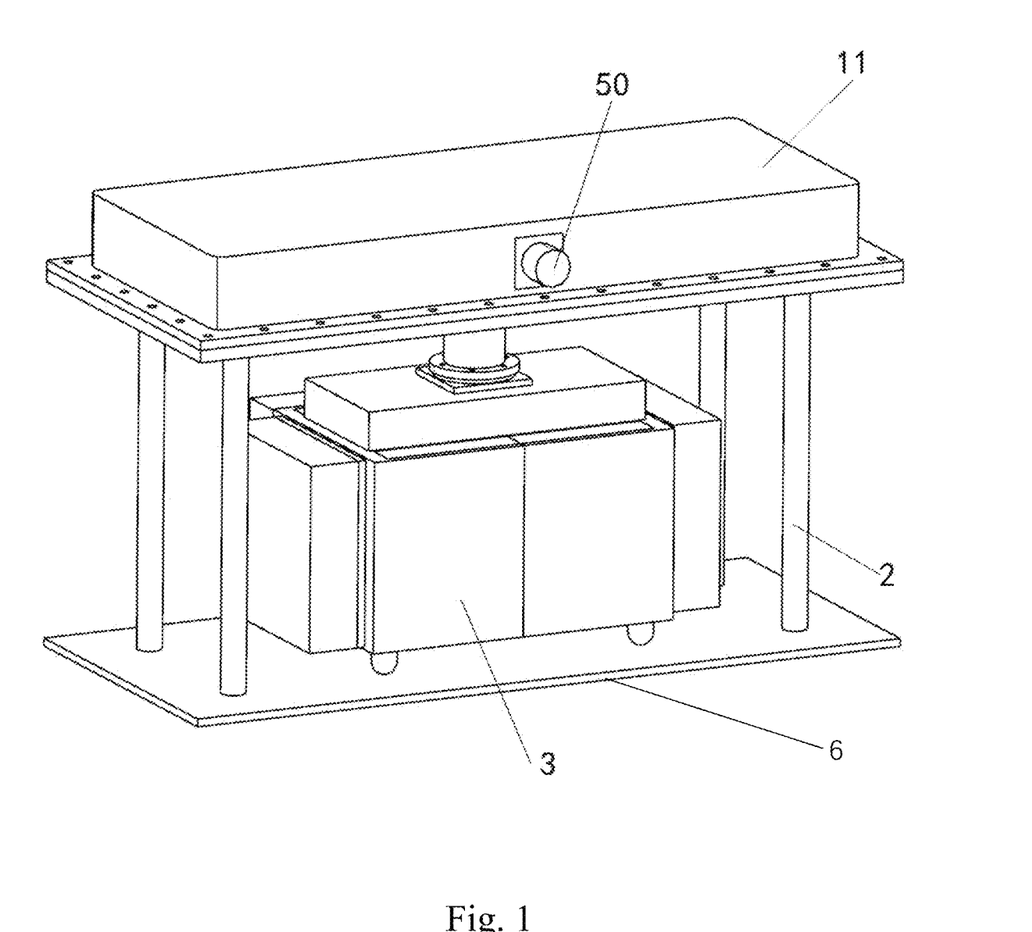
FIG. 1 schematically shows an overall structure of a cryostat device according to an embodiment of the present disclosure.
Figure 2:
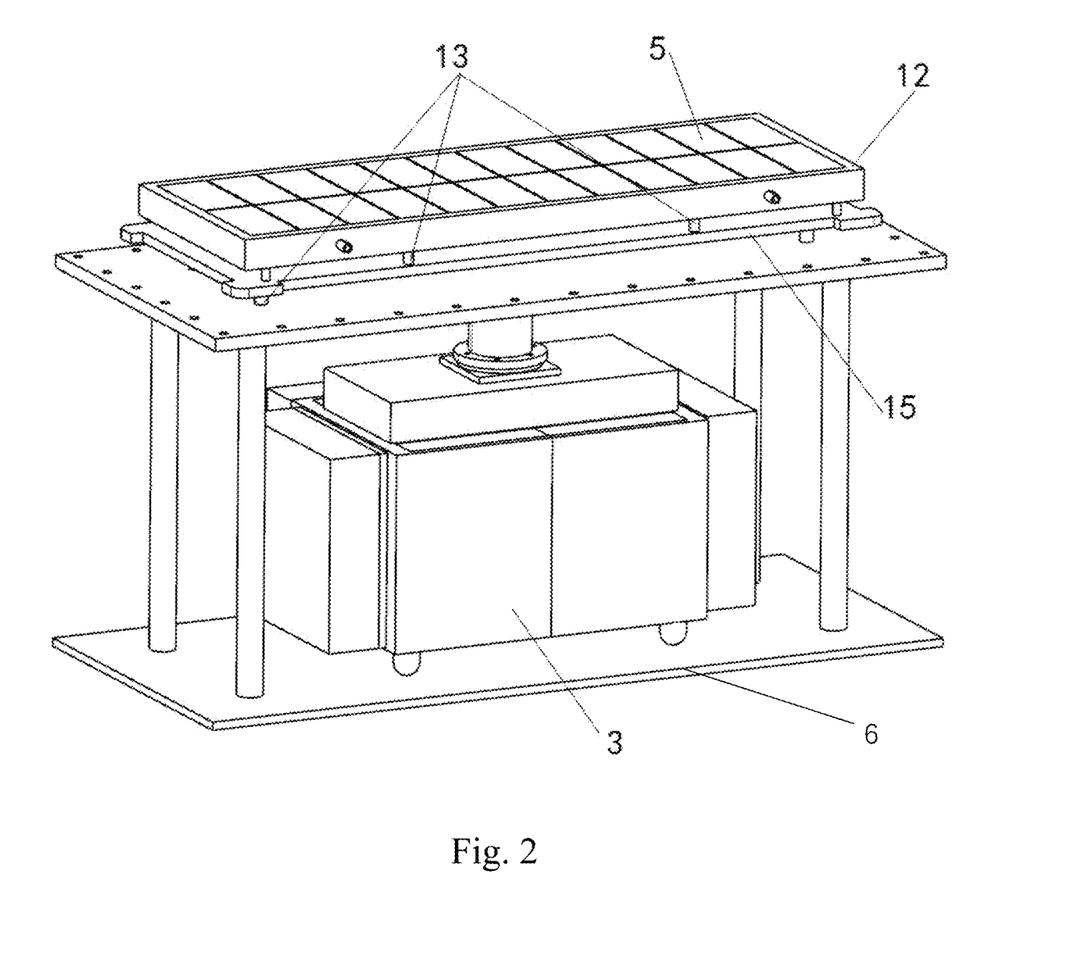
FIG. 2 schematically shows an overall structure of the cryostat device according to an embodiment of the present disclosure after removing a top wall and a side wall of a conduction shell.
Figure 3:
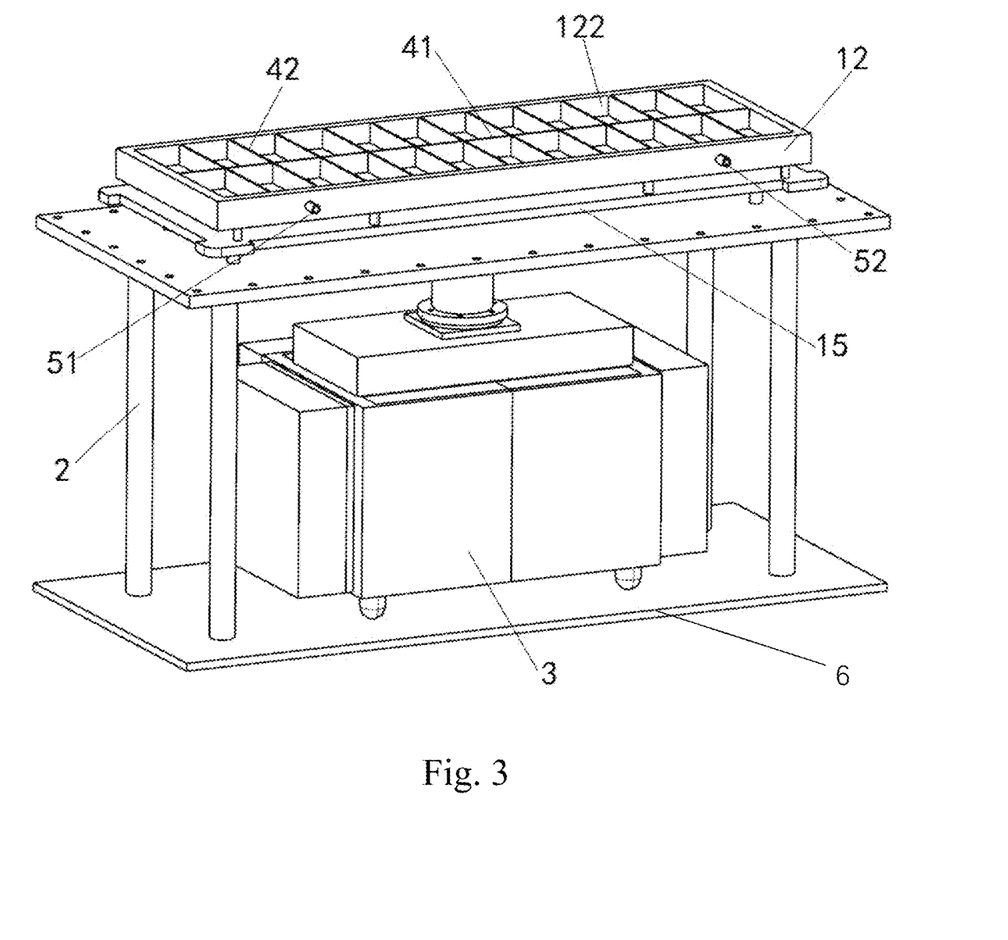
FIG. 3 schematically shows the cryostat device in FIG. 2 without a superconducting bulk.
Figure 4:
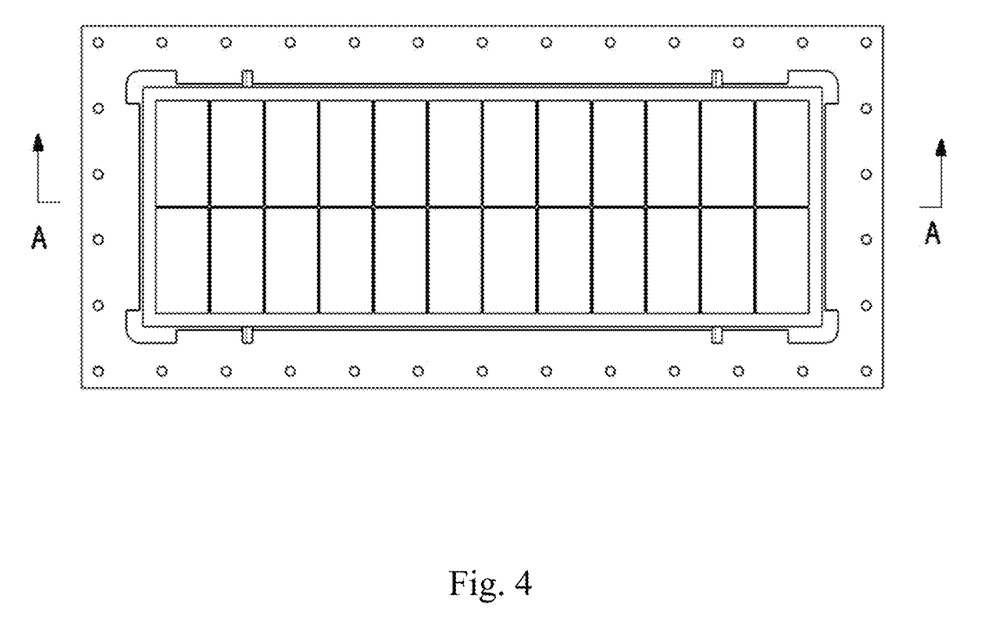
FIG. 4 is a top view of the cryostat device according to an embodiment of the present disclosure in the absence of the top wall and side wall of the conduction shell and a support assembly.
Figure 5:
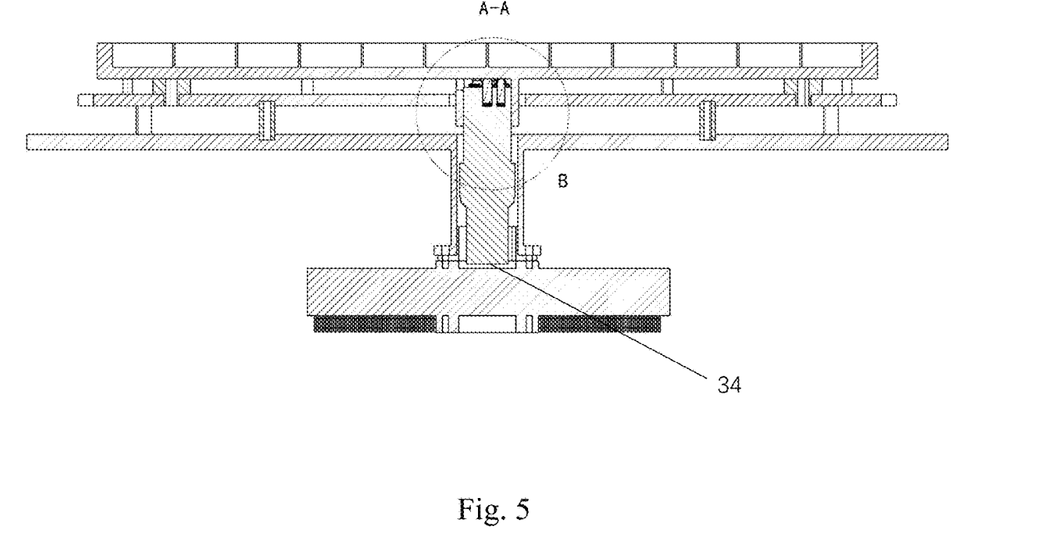
FIG. 5 is a sectional view of the cryostat device in FIG. 4 along an A-A line.
Figure 6:
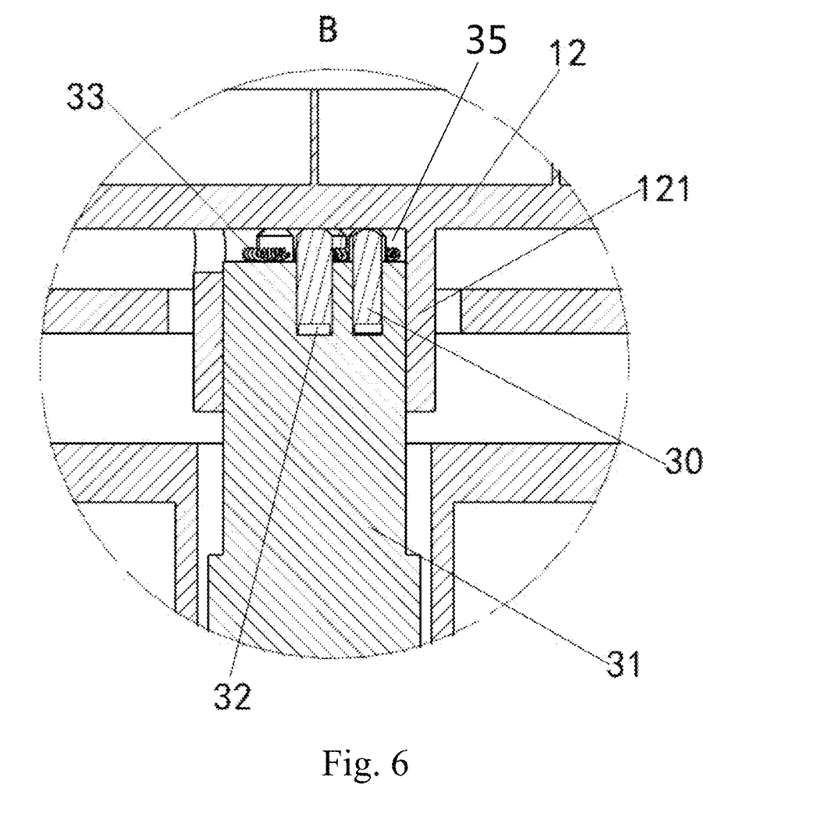
FIG. 6 is an enlarged view of portion "B" in FIG. 5.

In an embodiment, in order to determine specific structures of the cooling energy input end 30 and the cooling energy connecting end 121, the cooling energy input end 30 is configured as a cold finger conduction column, and the refrigeration assembly 3 is provided with a cold finger mounting base 31. The cold finger conduction column is provided on the cold finger mounting base 31, and a bottom of the cold finger mounting base 31 is configured as a reference plane 34. A vertical distance between a top of the cold finger conduction column and the reference plane 34 is represented as a first vertical distance, and a vertical distance between a top of the cold finger mounting base and the reference plane 34 is represented as a second vertical distance. The first vertical distance is larger than the second vertical distance.

In an embodiment, the cooling energy connecting end 121 is configured as a mounting cylinder. An outer wall of the cold finger mounting base 31 is configured to be clamped in the mounting cylinder to form a conduction cooling cavity 35 in the mounting cylinder. The top of the cold finger conduction column is configured to be in contact with the bottom of the copper box 12 in the conduction cooling cavity 35.

Figure 7:
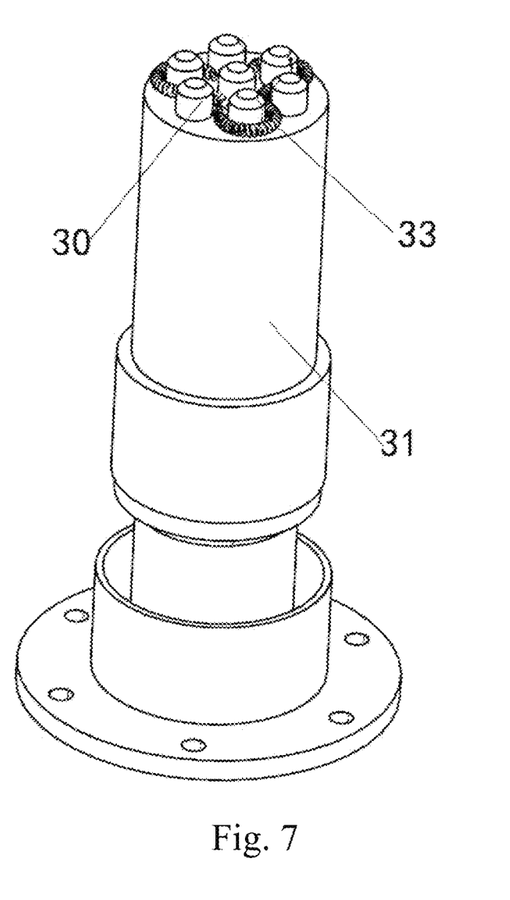
FIG. 7 schematically shows arrangement of a resistance wire according to an embodiment of the present disclosure.

Referring to FIG. 7, on the one hand, the cryostat device further includes an adjusting spring 32 to ensure a contact stability between the top of the cold finger conduction column in the conduction cooling cavity 35 and the bottom of the copper box 12. On the other hand, the cryostat device further includes a resistance wire 33 to maintain a preset temperature of the cold finger conduction column.

In an embodiment, the top of the cold finger mounting base 31 is provided with a spring mounting groove. The adjusting spring 32 is arranged in the spring mounting groove. A top of the adjusting spring 32 is fixedly connected with the cold finger conduction column, and a bottom of the adjusting spring is fixedly connected with a bottom of the spring mounting groove.

In an embodiment, the resistance wire 33 is sleevely provided on an outer circumference of the cold finger conduction column, and a bottom of the resistance wire 33 is configured to be in contact with the top of the cold finger mounting base 31.

In an embodiment, in order to realize accurate temperature control, the cryostat device further includes a temperature sensor group. The temperature sensor group includes a first temperature sensor, a second temperature sensor, a third temperature sensor and a fourth temperature sensor. The first temperature sensor is arranged on a first side of the copper box 12, and the second temperature sensor is arranged on a second side of the copper box 12. The third temperature sensor is configured to be arranged on a seed crystal surface of each of the plurality of superconducting bulks 5. The fourth temperature sensor is arranged on the cold finger conduction column.

In an embodiment, a linkage between the fourth temperature sensor and the resistance wire 33 is provided to further accurately ensure a maintenance of preset temperature of the cold finger conduction column.

In an embodiment, in order to facilitate real-time feedback of temperature sensor data, the cryostat device further includes an aviation plug 50. The aviation plug 50 is arranged on the conduction shell 11. A first end of the aviation plug 50 is configured to be electrically connected with the temperature sensor group, and a second end of the aviation plug 50 is configured to be electrically connected with a temperature controller. The temperature controller is configured to be electrically connected with a monitor.

In an embodiment, in order to facilitate monitoring a vacuum degree in the conduction shell 11, the cryostat device further includes a first vacuum nozzle 51 and a second vacuum nozzle 52. The first vacuum nozzle 51 and the second vacuum nozzle 52 are arranged on the conduction shell 11. The first vacuum nozzle 51 is configured to be connected with a vacuum meter to measure the vacuum degree in the conduction shell 11, and a second vacuum nozzle 52 is configured to be connected with a vacuum pump to reach a preset vacuum degree.

Figure 8:
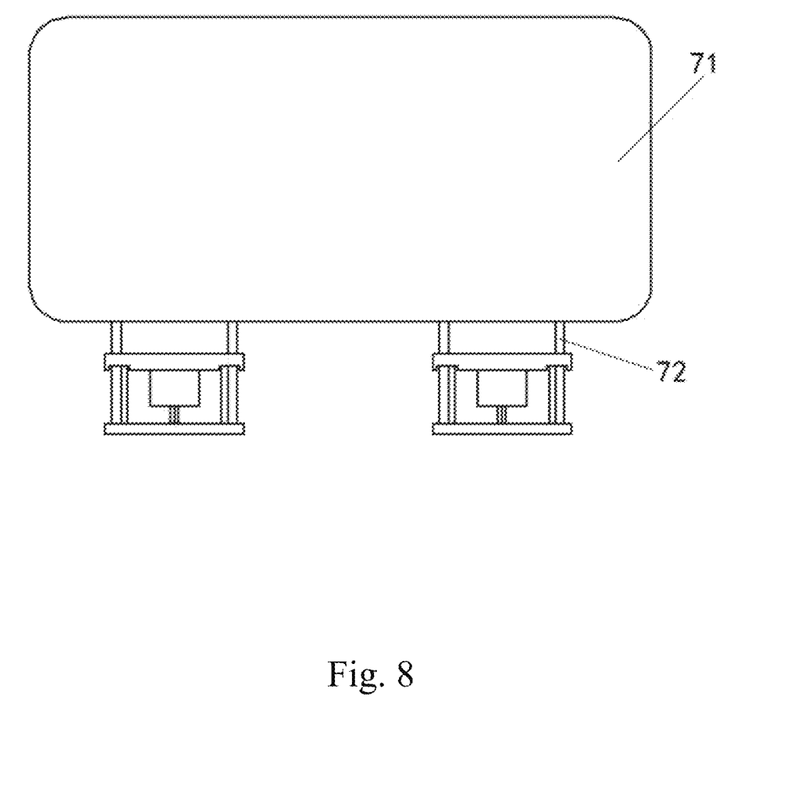
FIG. 8 schematically shows connection of the cryostat device according to an embodiment of the present disclosure to a train body.

Referring to FIG. 8, the cryostat device is configured to be connected with a train body 71 through a connecting rod 72.

The connecting rod 72 provides a connecting force between the train body 71 and the cryostat device.

Figure 9:
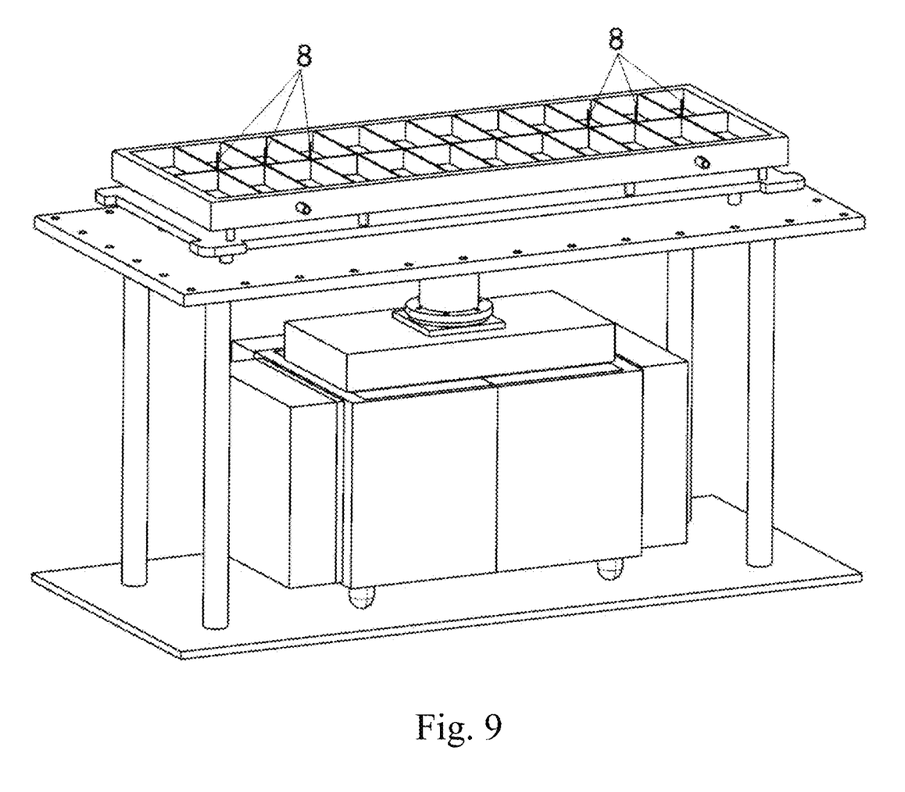
FIG. 9 schematically shows arrangement of the conduction shell and a compression rod according to an embodiment of the present disclosure.

Referring to FIG. 9, considering that the conduction shell 11 will withstand the atmospheric pressure during operation, the cryostat device further includes a compression rod 8. A connecting area is formed at a connecting position of the transverse fin 41 and each of the plurality of longitudinal fins 42. A 2.5 mm mounting seam is provided in the connecting area. The compression rod 8 is clamped in the mounting seam. An external diameter of the compression rod 8 is 2 mm. A top of the compression rod 8 is configured to be in contact with an inner wall of a top of the conduction shell 11, and a bottom of the compression rod 8 is fixedly connected with a top of the thermal bridge 15. A wall thickness of the top of the conduction shell 11 is 1.5-2 mm. In this structure, on the one hand, a mounting distance between the plurality of superconducting bulks 5 and tracks set at the later period can be reduced to ensure a smoothness of the tracks, on the other hand, the conduction shell 11 is ensure to withstand stable atmospheric pressure.

Embodiment 2

A method for operating the cryostat device is provided, including the following steps.

The refrigeration assembly 3 is started. A preset cooling energy is input from the cooling energy input end 30, and the preset cooling energy is conducted through the cooling energy connecting end 121.

The preset cooling energy is conducted into the superconducting bulk accommodating cavity in the copper box 12 to cool the plurality of superconducting bulks 5 in the superconducting bulk accommodating cavity.

According to a temperature feedback from the temperature sensor group, a power of the resistance wire is adjusted to make the plurality of superconducting bulks 5 reach a preset low-temperature value.

In this embodiment, the method has following two operation modes.

(1) The plurality of superconducting bulks 5 are subjected to reach a minimum temperature of 53 K-55 K and maintenance.

(2) The plurality of superconducting bulks 5 are set to reach a target temperature. According to the feedback from the first temperature sensor, the second temperature sensor, the third temperature sensor and the fourth temperature sensor, the power of the resistance wire is adjusted to make the plurality of superconducting bulks 5 reach the target temperature.

Described above are only preferred embodiments of this application, which are not intended to limit this application. For those skilled in the art, various modifications and variations can be made to this application. It should be understood that any modifications, equivalent replacements and improvements made within the spirit and principle of this application shall fall within the scope of this application defined by the appended claims.

What is claimed is:
1. A cryostat device for a superconducting magnetic levitation train, comprising:
 a conduction assembly;
 a support assembly; and
 a refrigeration assembly;
 wherein the conduction assembly comprises a conduction shell, a copper box, and a thermally-conductive support rod assembly; the copper box is arranged in the conduction shell; a top of the thermally-conductive support rod assembly is fixedly connected with a bottom of the copper box, and a bottom of the thermally-conductive support rod assembly is fixedly connected with a bottom wall of the conduction shell; a top of the copper box is provided with a superconducting bulk accommodating cavity, and the bottom of the copper box is provided with a cooling energy connecting end;

a top of the support assembly is configured to support the conduction assembly, and a bottom of the support assembly is configured to be connected with a bogie chassis of the superconducting magnetic levitation train;

the refrigeration assembly is provided with a cooling energy input end, and the cooling energy input end is connected with the cooling energy connecting end; the cooling energy input end is configured as a cold finger conduction column; the refrigeration assembly is further provided with a cold finger mounting base; the cold finger conduction column is provided on the cold finger mounting base, and a bottom of the cold finger mounting base is configured as a reference plane; a vertical distance between a top of the cold finger conduction column and the reference plane is represented as a first vertical distance, and a vertical distance between a top of the cold finger mounting base and the reference plane is represented as a second vertical distance; and the first vertical distance is larger than the second vertical distance; and the cooling energy connecting end is configured as a mounting cylinder; an outer wall of the cold finger mounting base is configured to be clamped in the mounting cylinder to form a conduction cooling cavity in the mounting cylinder; and the top of the cold finger conduction column is configured to be in contact with the bottom of the copper box in the conduction cooling cavity.

2. The cryostat device of claim 1, further comprising:
a fin assembly;
wherein the fin assembly comprises a transverse fin and a plurality of longitudinal fins; the transverse fin is arranged along a lengthwise direction of the copper box, and the plurality of longitudinal fins are perpendicularly connected to the transverse fin in sequence such that a plurality of superconducting bulk mounting cavities are formed in the superconducting bulk accommodating cavity; and each of the plurality of superconducting bulk mounting cavities has a preset volume.

3. The cryostat device of claim 2, further comprising:
a plurality of superconducting bulks;
wherein the plurality of superconducting bulks are connected with the plurality of superconducting bulk mounting cavities in one-to-one correspondence, and a mounting height of each of the plurality of superconducting bulks is flush with the top of the copper box.

4. The cryostat device of claim 1, wherein the conduction assembly further comprises a thermal bridge; the thermal bridge is provided between the copper box and the bottom wall of the conduction shell; the thermally-conductive support rod assembly comprises a first support rod group and a second support rod group; a top of the first support rod group is fixedly connected with the bottom of the copper box, and a bottom of the first support rod group is fixedly connected with a top of the thermal bridge; a top of the second support rod group is fixedly connected with a bottom of the thermal bridge, and a bottom of the second support rod group is fixedly connected with the bottom wall of the conduction shell.

5. The cryostat device of claim 3, further comprising:
an adjusting spring; and
a resistance wire;
wherein the top of the cold finger mounting base is provided with a spring mounting groove; the adjusting spring is arranged in the spring mounting groove; a top of the adjusting spring is fixedly connected with the cold finger conduction column; and a bottom of the adjusting spring is fixedly connected with a bottom of the spring mounting groove; and
the resistance wire is sleevedly provided on an outer circumference of the cold finger conduction column; and a bottom of the resistance wire is configured to be in contact with the top of the cold finger mounting base.

6. The cryostat device of claim 5, further comprising:
an aviation plug;
wherein the aviation plug is arranged on the conduction shell.

7. The cryostat device of claim 1, further comprising:
a first vacuum nozzle; and
a second vacuum nozzle;
wherein the first vacuum nozzle and the second vacuum nozzle are arranged on the conduction shell.

8. A method for operating the cryostat device of claim 5, comprising:
starting the refrigeration assembly; inputting a preset cooling energy from the cooling energy input end, and conducting the preset cooling energy through the cooling energy connecting end;
conducting the preset cooling energy into the superconducting bulk accommodating cavity in the copper box to cool the plurality of superconducting bulks in the superconducting bulk accommodating cavity; and
adjusting a power of the resistance wire to make the plurality of superconducting bulks reach a preset temperature value.

* * * * *